US011837742B2

(12) United States Patent
Honda et al.

(10) Patent No.: US 11,837,742 B2
(45) Date of Patent: Dec. 5, 2023

(54) PARTITION MEMBER AND ASSEMBLED BATTERY

(71) Applicant: Mitsubishi Chemical Corporation, Tokyo (JP)

(72) Inventors: Tatsuhiko Honda, Tokyo (JP); Naoto Maru, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 46 days.

(21) Appl. No.: 17/030,440

(22) Filed: Sep. 24, 2020

(65) Prior Publication Data

US 2021/0013471 A1 Jan. 14, 2021

Related U.S. Application Data

(63) Continuation of application No. PCT/JP2019/014237, filed on Mar. 29, 2019.

(30) Foreign Application Priority Data

Mar. 30, 2018 (JP) ................. 2018-070009

(51) Int. Cl.
*H01M 50/24* (2021.01)
*H01M 10/647* (2014.01)
(Continued)

(52) U.S. Cl.
CPC ......... *H01M 50/24* (2021.01); *H01M 10/647* (2015.04); *H01M 10/658* (2015.04);
(Continued)

(58) Field of Classification Search
None
See application file for complete search history.

(56) References Cited

U.S. PATENT DOCUMENTS

| 6,146,783 A | 11/2000 | Brohm et al. |
| 2011/0195291 A1 | 8/2011 | Yokoyama et al. |

(Continued)

FOREIGN PATENT DOCUMENTS

| FR | 3023416 A3 * | 1/2016 |
| JP | 2000-48867 A | 2/2000 |

(Continued)

OTHER PUBLICATIONS

Extended European Search Report dated Apr. 23, 2021 in European Patent Application No. 19776921.9, 7 pages.

(Continued)

*Primary Examiner* — Lisa S Park
(74) *Attorney, Agent, or Firm* — Oblon, McClelland, Maier & Neustadt, L.L.P.

(57) ABSTRACT

A partition member which has a thickness direction and a planar direction orthogonal to the thickness direction and which constitutes a partition between single batteries in the thickness direction or between a single battery and a member other than the single battery, wherein the partition member includes a thermal insulation material, and an auxiliary member which is disposed so as to be adjacent to the thermal insulation material in the planar direction and regulates a degree of contraction of the thermal insulation material in the thickness direction. A ratio of a density of the auxiliary member relative to a density of the thermal insulation material is 0.50 to 6.0.

19 Claims, 9 Drawing Sheets

(51) Int. Cl.
*H01M 10/658* (2014.01)
*H01M 10/613* (2014.01)
*H01M 10/6555* (2014.01)
*H01M 50/105* (2021.01)
*H01M 50/211* (2021.01)
*H01M 50/242* (2021.01)
*H01M 50/291* (2021.01)
*H01M 50/293* (2021.01)
*H01M 10/052* (2010.01)
*H01M 50/204* (2021.01)

(52) U.S. Cl.
CPC ....... *H01M 50/204* (2021.01); *H01M 50/291* (2021.01); *H01M 50/293* (2021.01)

(56) References Cited

U.S. PATENT DOCUMENTS

| | | |
|---|---|---|
| 2012/0219838 A1 | 8/2012 | Terada et al. |
| 2013/0244090 A1 | 9/2013 | Tanaka et al. |
| 2013/0302659 A1 | 11/2013 | Terada et al. |
| 2014/0044995 A1* | 2/2014 | Moon ................ H01M 10/425 429/7 |
| 2014/0045028 A1 | 2/2014 | Moon et al. |
| 2016/0185068 A1 | 6/2016 | Shinohara et al. |
| 2017/0301965 A1 | 10/2017 | Kato et al. |

FOREIGN PATENT DOCUMENTS

| | | | |
|---|---|---|---|
| JP | 2011-108617 A | | 6/2011 |
| JP | 2012-252959 A | | 12/2012 |
| JP | 2013-219027 A | | 10/2013 |
| JP | 2014-157747 A | | 8/2014 |
| JP | 2014147747 A | * | 8/2014 |
| JP | 2015-138753 A | | 7/2015 |
| JP | 2016-084836 A | | 5/2016 |
| JP | 2016-121804 A | | 7/2016 |
| JP | 105762310 A | | 7/2016 |
| WO | WO 2010/143408 A1 | | 12/2010 |

OTHER PUBLICATIONS

International Preliminary Report on Patentability and Written Opinion dated Oct. 15, 2020 in PCT/JP2019/014237, 6 pages.
International Search Report dated Jun. 11, 2019 in PCT/JP2019/014237 filed on Mar. 29, 2019, 4 pages (with English Translation).
Combined Chinese Office Action and Search Report dated May 7, 2022 in Chinese Patent Application No. 201980020847.7 (with unedited computer generated English translation), 32 pages.

* cited by examiner

PARTITION MEMBER AND ASSEMBLED BATTERY

CROSS-REFERENCE TO RELATED APPLICATION

This application is a continuation application of International Application PCT/JP2019/014237 filed on Mar. 29, 2019 and designated the U.S., and this application is based upon and claims the benefit of priority of the prior Japanese Patent Application No. 2018-070009, filed on Mar. 30, 2018, the entire contents of which are incorporated herein by reference.

BACKGROUND

1. Field

The present invention relates to a partition member and an assembled battery.

2. Description of the Related Art

In battery modules containing secondary batteries (hereinafter also referred to as single batteries) mounted in moving bodies, such as vehicles and ships, various investigations have been carried out into the techniques mentioned below for using elastic members as partition members or parts of partition members disposed between single batteries.

For example, there exists a secondary battery module in which a buffer plate, which allows expansion of single batteries and can correctly maintain a surface pressure applied to single batteries, is disposed between single batteries (for example, see PTL 1). In addition, there exists an assembled battery in which a thermally conductive member, which contains as a base material a resin member having a high flexural modulus, is disposed between single battery cells in order to suppress transfer of heat to an adjacent single battery cell and effectively dissipate heat to a heat dissipation space (for example, see PTL 2). In addition, there exists a secondary battery module having an insulating member which insulates a positive electrode and a negative electrode of an electrode group from a battery container and which absorbs vibration (for example, see PTL 3). Furthermore, use of a thermal insulation material in order to control the temperature of a battery has been disclosed (for example, see PTL 4).

PTL 1: Japanese Patent Application Publication No. 2014-157747
PTL 2: Japanese Patent Application Publication No. 2011-108617
PTL 3: Japanese Patent Application Publication No. 2013-219027
PTL 4: U.S. Pat. No. 6,146,783

SUMMARY

In an assembled battery that includes a plurality of single batteries and partition members that constitute partitions between single batteries, in cases where one of the plurality of single batteries generates an abnormal amount of heat (this means "cases where some or all of the chemical substances that constitute an electrode, an electrolyte solution, and the like, that constitute a single battery undergo a decomposition reaction as a result of heat generated inside the single battery, thereby causing the temperature of the single battery to increase and some or all of the regions of the single battery to reach a temperature of 200° C. or higher"), it is thought that heat from the single battery in which an abnormal amount of heat has been generated is transmitted, via a partition member, to a single battery in which an abnormal amount of heat has not been generated. In some cases, a plurality of single batteries that constitute an assembled battery are accommodated in a housing in a state whereby, for example, the secondary batteries are arranged in the thickness direction and pressure is exerted in the thickness direction. In such a case, pressure is also exerted on a partition member sandwiched between single batteries and on a partition member arranged between a single battery and a member other than the single battery. Partition members are subjected to a constraining force and are compressed when single batteries are accommodated in a housing. It is known that single batteries expand when charged and also when exposed to high temperatures. In such cases, further pressure is exerted on a partition member. The partition member is further compressed as the pressure increases.

Meanwhile, a single battery contracts when discharged, but in such cases, pressure exerted on a partition member is alleviated. According to investigations by the inventors of the present invention, it was understood that a partition member does not recover to its initial state as a result of this contraction caused by discharging, and that problems occur, such as a gap being formed between the partition member and a secondary battery. It was understood that if a gap is formed between the partition member and the secondary battery in this way, air that penetrates into the gap acts as a thermal insulation layer, and favorable heat transfer between the secondary battery and the partition member is inhibited, meaning that problems occur, such as a decrease in thermal conductivity via the partition member.

Partition members according to prior art, such as those disclosed in PTL 1 to 3, are configured so as to include an elastic member (a buffer plate, a resin member, an insulating member, or the like) in order to act as a buffer between a single battery and the partition member, dissipate heat in a single battery, suppress vibration, and the like. Therefore, in cases where a single battery contracted, the problem of a gap being formed between a single battery and a partition member and close adhesion decreasing was not observed. In addition, PTL 4 discloses using a thermal insulation material in order to control the temperature of a battery, but in cases where this type of thermal insulation material is used, use in a state whereby a high constraining force is applied was not envisaged, and measures for dealing with such a state were not implemented.

The purpose of embodiments of the present invention is to provide a partition member and an assembled battery in which it is possible to avoid a gap being formed between the partition member and a single battery.

Aspects of the present invention are a partition member and an assembled battery below.

[1] A partition member which has a thickness direction and a planar direction orthogonal to the thickness direction and which constitutes a partition between single batteries in the thickness direction or between a single battery and a member other than the single battery, the partition member comprising:

a thermal insulation material, and an auxiliary member which is disposed so as to be adjacent to the thermal insulation material in the planar direction and regulates a degree of contraction of the thermal insulation material in the thickness direction, wherein a ratio of a density of the auxiliary member relative to a density of the thermal insulation material is 0.50 to 6.0.

[2] The partition member according to [1], wherein a ratio of an area of the auxiliary member relative to an area of the thermal insulation material is 0.020 to 1.0 when the thermal insulation material and the auxiliary member are seen in a planar view from the thickness direction.

[3] The partition member according to [1] or [2], wherein the density of the thermal insulation material is 0.23 to 1.1 $g/cm^3$.

[4] The partition member according to any one of [1] to [3], wherein the density of the auxiliary member is 0.30 to 2.0 $g/cm^3$.

[5] The partition member according to any one of [1] to [4], wherein when the thermal insulation material and the auxiliary member are seen in a planar view from the thickness direction, the shape of the thermal insulation material is rectangular, and the auxiliary member is positioned along two opposite sides of the rectangle, along three sides of the rectangle, along four sides of the rectangle, or at four corners of the rectangle.

[6] The partition member according to any one of [1] to [5], wherein the thermal insulation material is formed of a material that contains a porous body capable of retaining a liquid.

[7] The partition member according to [6], wherein the porous body contains at least one of a fibrous substance and particles.

[8] The partition member according to any one of [1] to [7], comprising an outer package body for accommodating the thermal insulation material and the auxiliary member.

[9] The partition member according to [8], wherein the outer package body is a laminated body of a metal foil and a resin.

[10] The partition member according to [9], wherein the metal foil is at least one type selected from an aluminum foil, a copper foil, a tin foil, a nickel foil, a stainless steel foil, a lead foil, a tin-lead alloy foil, a bronze foil, a silver foil, an iridium foil, and phosphor bronze.

[11] The partition member according to [9] or [10], wherein the resin is a thermoplastic resin.

[12] An assembled battery comprising a plurality of single batteries, a thermal insulation material, and an auxiliary member which is disposed so as to be adjacent to the thermal insulation material and regulates a degree of contraction of the thermal insulation material in a thickness direction of the thermal insulation material, wherein a ratio of a density of the auxiliary member relative to a density of the thermal insulation material is 0.50 to 6.0.

[13] The assembled battery according to [12], wherein a ratio of an area of the auxiliary member relative to an area of the thermal insulation material is 0.020 to 1.0 when the thermal insulation material is seen in a planar view from the thickness direction.

[14] The assembled battery according to [12] or [13], wherein the density of the thermal insulation material is 0.23 to 1.1 $g/cm^3$.

[15] The assembled battery according to any one of [12] to [14], wherein the density of the auxiliary member is 0.30 to 2.0 $g/cm^3$.

[16] The assembled battery according to any one of [12] to [15], wherein when the thermal insulation material and the auxiliary member are seen in a planar view from the thickness direction, the shape of the thermal insulation material is rectangular, and the auxiliary member is positioned along two opposite sides of the rectangle, along three sides of the rectangle, along four sides of the rectangle, or at four corners of the rectangle.

[17] The assembled battery according to any one of [12] to [16], wherein the thermal insulation material is formed of a material that contains a porous body capable of retaining a liquid.

[18] The assembled battery according to [17], wherein the porous body contains at least one of a fibrous substance and particles.

[19] The assembled battery according to any one of [12] to [17], comprising an outer package body for accommodating the thermal insulation material and the auxiliary member.

[20] The assembled battery according to [19], wherein the outer package body is a laminated body of a metal foil and a resin.

[21] The assembled battery according to [20], wherein the metal foil is at least one type selected from an aluminum foil, a copper foil, a tin foil, a nickel foil, a stainless steel foil, a lead foil, a tin-lead alloy foil, a bronze foil, a silver foil, an iridium foil, and phosphor bronze.

[22] The assembled battery according to [20] or [21], wherein the resin is a thermoplastic resin.

According to embodiments of the partition member and the assembled battery, it is possible to avoid a gap being formed between the partition member and a single battery.

DESCRIPTION OF EMBODIMENTS

Figure 1:
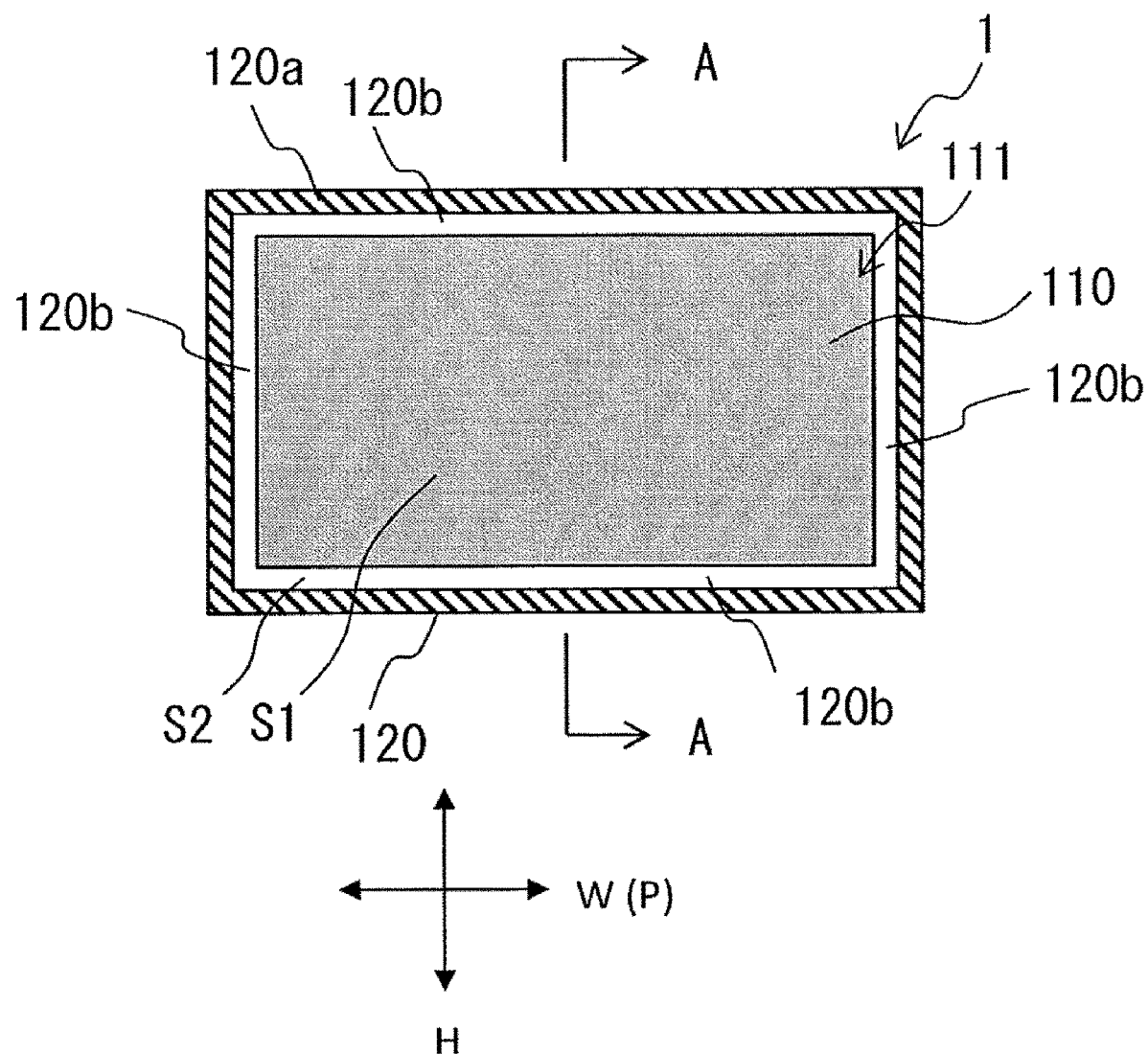
FIG. 1 illustrates a configuration of a partition member according to an embodiment.

The present invention will now be explained. Explanations of embodiments illustrated in the drawings below are merely exemplary, and the present invention is not limited to the configurations of the embodiments given below.

[Partition Member]

The partition member of the present invention has a thickness direction and a planar direction orthogonal to the thickness direction, and constitutes a partition between single batteries in the thickness direction or between a single battery and a member other than the single battery, wherein the partition member includes a thermal insulation material and an auxiliary member which is disposed so as to be adjacent to the thermal insulation material in the planar direction and regulates the degree of contraction of the thermal insulation material in the thickness direction, and the ratio of the density of the auxiliary material relative to the density of the thermal insulation material is 0.50 to 6.0.

By including the thermal insulation material and auxiliary member mentioned above, the partition member of the present invention can ensure recoverability of the thermal insulation material in cases where a constraining force is exerted during production of an assembled battery and in cases where the partition member is subjected to pressure and is compressed as a result of contraction of a single battery and the pressure caused by contraction of the single battery is then alleviated. That is, the partition member of the present invention can suppress a reduction in close adhesion to a single battery and can prevent a gap being formed between the partition member and the single battery. Due to this configuration, the partition member of the present invention can suppress a reduction in thermal conductivity.

Figure 2:
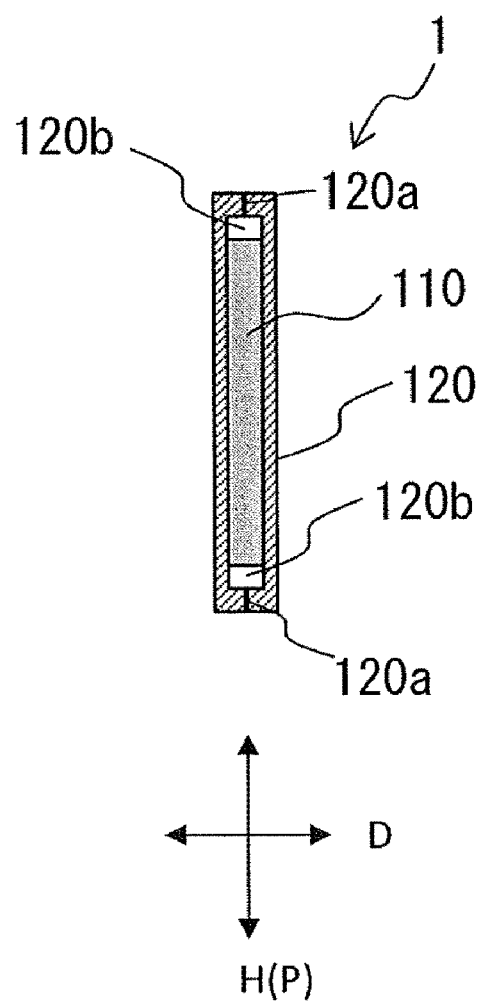
FIG. 2 is a cross-sectional view of a case where the partition member illustrated in FIG. 1 is cut along the line denoted by A-A.

FIG. 1 illustrates an example of a configuration of the partition member of the present invention. FIG. 1 illustrates a front view of a partition member 1. FIG. 2 illustrates a cross section of the right hand side of the partition member illustrated in FIG. 1, in a case where the partition member is cut along the line denoted by A-A.

In FIG. 1 and FIG. 2, the partition member 1 has an overall plate-like shape or sheet-like shape having a height direction (H), a width direction (W) and a thickness direction (D). The partition member 1 has a thickness direction (D) and a planar direction (P) that is orthogonal to the thickness direction (D). The planar direction (P) includes the height direction (H) and the width direction (D), and a plurality of oblique directions that lie between the height direction (H) and the width direction (D).

The partition member 1 is used to form a partition between single batteries that constitute an assembled battery or between a single battery and a member other than the single battery in the thickness direction (D) of the partition member. The partition member 1 has a thermal insulation material 110, an auxiliary member 130, and an outer package body 120 for accommodating the thermal insulation material 110. The outer package body 120 is optional.

[Thermal Insulation Material]

The thermal insulation material preferably has a density of 0.23 to 1.1 $g/cm^3$. If the density of the thermal insulation material is not lower than the lower limit mentioned above, many air layers are present in internal spaces and thermal insulation properties are improved, which is desirable. Meanwhile, if the density of the thermal insulation material is not higher than the upper limit mentioned above, the degree of deformation when compressed is low, which is desirable. In addition, from these perspectives, the density of the thermal insulation material is more preferably at least 0.25 $g/cm^3$, and further preferably at least 0.28 $g/cm^3$, and is more preferably not more than 1.0 $g/cm^3$, and more preferably not more than 0.90 $g/cm^3$.

Specifically, the thermal insulation material 110 is preferably formed of a material that contains a porous body. By using a porous body, in cases where the partition member contains a liquid, the liquid is favorably retained, meaning that distribution of the liquid in the partition member 1 readily forms a desired state. The porous body includes a fibrous substance (also referred to as a fibrous inorganic material) and particles (also referred to as a powdered inorganic material).

The fibrous substance (fibrous inorganic material) is, for example, preferably at least one type selected from the group consisting of paper, cotton sheets, polyimide fibers, aramid fibers, polytetrafluoroethylene (PTFE) fibers, glass fibers, rock wool, ceramic fibers and biosoluble inorganic fibers, and among these, at least one type selected from among glass fibers, rock wool, ceramic fibers and biosoluble inorganic fibers is particularly preferred. Ceramic fibers are fibers comprising mainly silica and alumina (silica:alumina=40:60 to 0:100), and more specifically, silica-alumina fibers, mullite fibers and alumina fibers can be used.

In addition, the particles (powdered inorganic material) are, for example, preferably at least one type selected from the group consisting of silica particles, alumina particles, calcium silicate, clay minerals, vermiculite, mica, cement, pearlite, fumed silica and aerogel, and among these, at least one type selected from among silica particles, alumina particles, calcium silicate and vermiculite is particularly preferred. Among types of calcium silicate, xonotlite, tobermorite, wollastonite and gyrolite are preferred, and gyrolite is particularly preferred. Gyrolite, which has a floriform structure, exhibits excellent water retaining properties due to maintaining a porous structure even when subjected to compressive deformation. Principal clay minerals are magnesium silicate (including talc and sepiolite), montmorillonite and kaolinite.

The entire thermal insulation material 110 may be formed of a porous body. In the explanations given below, the entire thermal insulation material 110 is formed of a porous body and a liquid is retained inside cavities in the porous body. It is preferable for the thermal insulation material 110 to be elastic so as to be able to respond to pressure. That is, by being elastic, the thermal insulation material 110 is compressed as a result of a constraining force or pressure caused by expansion of a single battery, and recovers to its initial state when pressure from the single battery is alleviated by contraction of the single battery. Therefore, the thermal insulation material 110 can maintain a closely adhered state to a single battery or a member other than a single battery.

[Liquid]

In the partition member of the present invention and the assembled battery of the present invention, in cases where a porous body capable of retaining a liquid is used, the liquid used is preferably a liquid having a boiling point of at least 80° C. and not more than 250° C. at normal pressure, and more preferably a liquid having a boiling point of at least 100° C. and not more than 150° C. at normal pressure. In addition to water, the liquid preferably includes at least one type selected from the group consisting of, for example, alcohols, esters, ethers, ketones, hydrocarbons, fluorine-based compounds and silicone-based oils. It is possible to use one of these or a mixture of two or more types thereof. The liquid may contain additives such as substances that impart anti-freeze properties (anti-freeze agents), preservatives and pH-adjusting agents. By imparting anti-freeze properties, it is possible to prevent an outer package body from breaking due to expansion caused by freezing. In addition, by adding a pH-adjusting agent, it is possible to reduce changes in the pH of the liquid caused by components eluting from the powdered inorganic material and reduce degeneration of the powdered inorganic substance, the outer package body and the liquid (water) per se. Substances contained in the liquid are not limited to this, and other substances can be added according to need.

[Outer Package Body]

The outer package body 120 accommodates the liquid and the thermal insulation material 110 in a sealed state. A film or sheet of a resin or metal can be used as the outer package body 120. For example, laminating a thermal insulation material that retains a liquid using a film or sheet obtained by layering a metal and a resin is preferred from the perspectives of obtaining high heat resistance and strength. A laminated body having at least three layers, including a resin layer, a metal layer and a resin sealant layer, is preferred as a laminated body which has a layered structure of a metal and a resin and which is used for the lamination mentioned above. The metal is, for example, an aluminum foil, a copper foil, a tin foil, a nickel foil, a stainless steel foil, a lead foil, a tin-lead alloy foil, a bronze foil, a silver foil, an iridium foil, a phosphor bronze foil, or the like. In particular, an aluminum foil, a copper foil or a nickel foil is preferred, and an aluminum foil is more preferred. The metal is preferably at least one type of metal selected from among those listed above.

In addition, a thermosetting resin and/or a thermoplastic resin can be used as the resin. However, use of a thermoplastic resin is preferred. Examples of resins include polyethylene, polypropylene, polystyrene, nylon resins, acrylic resins, epoxy resins, polyurethanes, polyether ether ketones, polyethylene terephthalate, polyphenylene sulfide, polycarbonates and aramid resins. In particular, the resin is preferably at least one type selected from among polypropylene, nylon resins and polyethylene terephthalate.

The thickness of the outer package body 120 is not particularly limited, but is, for example, 5 to 200 μm. In the case of the layered product mentioned above, the thickness of the metal foil may be 3 to 50 μm and the thickness of the resin layer may be 2 to 150 μm. Due to this configuration, it is possible to ensure that the heat resistance and low water vapor permeability of the metal foil are achieved and possible to improve sealing properties by means of the resin.

In addition, the thermal insulation material 110 is sealed inside the outer package body 120 by joining edge parts of two outer package bodies 120 in a ring-like shape by means of heat sealing, bonding, or the like. Alternatively, the liquid and the thermal insulation material 110 may be sealed by folding one outer package body and bonding the edge part thereof by means of heat sealing, bonding, or the like. The outer package body 120 is preferably flexible (elastic), but may, in some cases, not be flexible.

In the example shown in FIG. 1, the outer package body 120 is provided with a sealing part 120a that seals the edge part of the outer package body, and the thermal insulation material 110 is accommodated in an internal space 111 that is formed in the outer package body 120 by sealing with the sealing part 120a. In the example shown in FIG. 1, a gap 120b is provided in the internal space 111 between the sealing part 120a and the thermal insulation material 110. In other words, in a planar view of the front of the partition member 1, the internal space 111 includes a first region S1 in which the outer package body 120 and the thermal insulation material 110 overlap and a second region S2 in which the outer package body 120 and the thermal insulation material 110 do not overlap. However, the gap 120b is not necessarily essential. The gap 120b may be in a state whereby inner surfaces of the outer package body 120 are in contact with each other in cases where a fluid (a gas or liquid) is not present therein. Moreover, in the present invention, the volume of the internal space 111 is defined as the product of the area of the internal space 111 and the thickness of the thermal insulation material 110. In addition, the position of the thermal insulation material 110 is not necessarily the center of the internal space 111, and the thermal insulation material is not necessarily parallel to the outer package body.

[Auxiliary Member]

The auxiliary member 130 is used in order to ensure recoverability of the thermal insulation material 110 when the partition member 1 is compressed as a result of expansion of a single battery and the pressure is then alleviated as a result of contraction of the single battery, or the like. The auxiliary member 130 preferably has a different elastic modulus from the thermal insulation material 110. That is, by having a different elastic modulus from the thermal insulation material 110, the auxiliary member 130 can regulate the degree of contraction of the thermal insulation material 110 and suppress excessive compression of the thermal insulation material 110. The auxiliary member 130 is disposed so as to be adjacent to the thermal insulation material 110 in the planar direction of the partition member 1. The term "adjacent" means that the thermal insulation material 110 and the auxiliary member 130 are adjacent to each other, and includes cases where the thermal insulation material 110 and the auxiliary member 130 are in contact with each other or are close to each other (without being in contact). In addition, the term "adjacent" also encompasses a case where another member is interposed between the thermal insulation material 110 and the auxiliary member 130. In addition to cases where the auxiliary member is disposed around the periphery of the thermal insulation material in the planar direction, this also encompasses cases where the auxiliary member is disposed in such a way as to be surrounded by the thermal insulation material. In addition, some or all of the auxiliary member 130 may overlap the thermal insulation material 110 in the thickness direction of the partition member 1.

The auxiliary member 130 ensures recoverability in cases where pressure from a single battery is alleviated, and is therefore preferably, for example, an elastic member such as a rubber. For example, rubber-based materials such as silicone rubbers, isoprene rubbers, butadiene rubbers, styrene rubbers, butyl rubbers and ethylene-propylene rubbers can be used as rubbers. The auxiliary member 130 is not limited to rubber-based materials as long as the auxiliary member is elastic and is deformed by pressure.

[Pressure Exerted on Partition Member]

Figure 3:
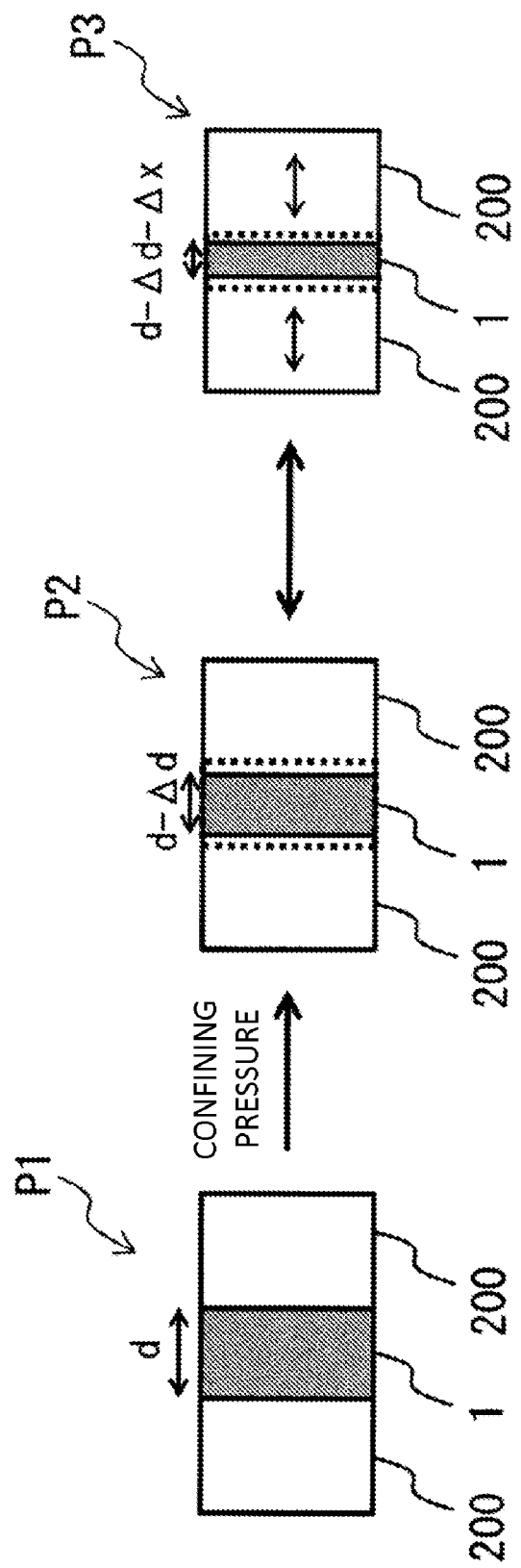
FIG. 3 is a diagram that explains pressure exerted on a partition member.

FIG. 3 is a diagram that explains pressure exerted on a partition member. P1 illustrates a state in which the partition member 1 is disposed between single batteries prior to establishment. The thickness of the partition member 1 prior to establishment (the length of the partition member in the thickness direction) is denoted by d. P2 illustrates a state in which, when an assembled battery is established, the partition member 1 is subjected to a prescribed constraining force from single batteries in the thickness direction. The partition member 1 is compressed in the thickness direction by the constraining force, and the thickness becomes d-Δd. P3 illustrates a state in which single batteries expand as a result of charging and the partition member 1 is subjected to pressure as a result of expansion of the single batteries in addition to a constraining force. The partition member 1 is further compressed from the state of S2, and the thickness becomes d-Δd-Δx.

The single batteries expand as a result of charging, and then contract as a result of discharging. Therefore, pressure exerted on the partition member 1 from the single batteries is alleviated. In cases where pressure exerted from the single batteries is alleviated, if the partition member 1 does not recover from a state whereby the partition member is compressed and has a reduced thickness, a gap is formed between the partition member and a single battery, and thermal resistance between single batteries increases. As a result, when external pressure is alleviated, recoverability of the partition member 1 is ensured by disposing the auxiliary member 130, which has a different elastic modulus from the thermal insulation material 110.

[Positioning of Auxiliary Member]

Figure 4:
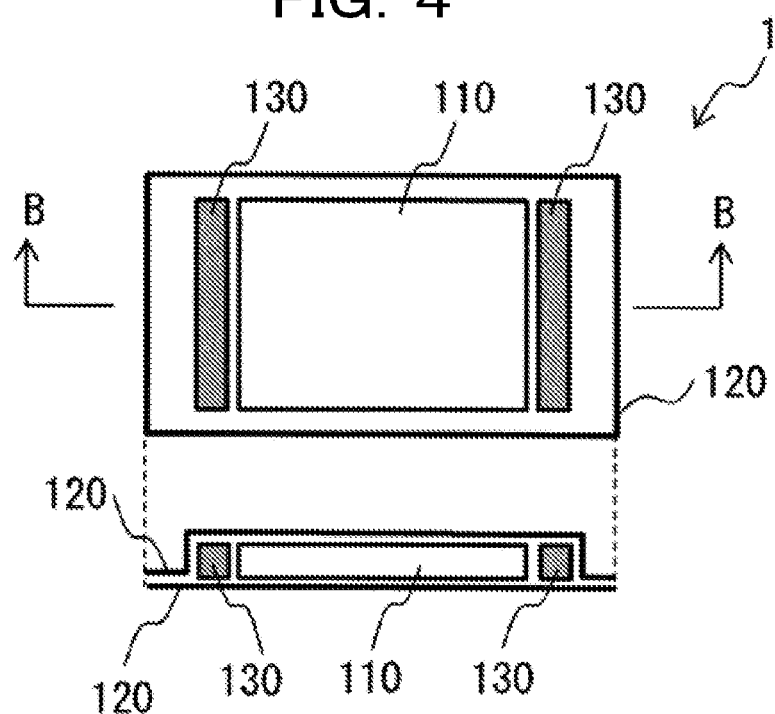
FIG. 4 is a diagram that illustrates an example of the positioning of an auxiliary member.

Using FIG. 4 and FIG. 5, an explanation will now be given of an example in which the auxiliary member 130 is positioned so as to be adjacent to the thermal insulation material 110 in the planar direction of the partition member 1. FIG. 4 is a diagram that illustrates an example of the positioning of an auxiliary member 130. FIG. 4 illustrates a diagram in which the partition member 1 is seen in a planar view from the thickness direction and a cross-sectional view of a case where the partition member 1 is cut along the line denoted by B-B. In the partition member 1 illustrated in FIG. 4, the auxiliary member 130 is disposed along two opposite sides of the thermal insulation material 110 in the planar direction. In addition, the auxiliary member 130 and the thermal insulation material 110 are encompassed by the outer package body 120, as illustrated by the cross-sectional view.

Figure 5:
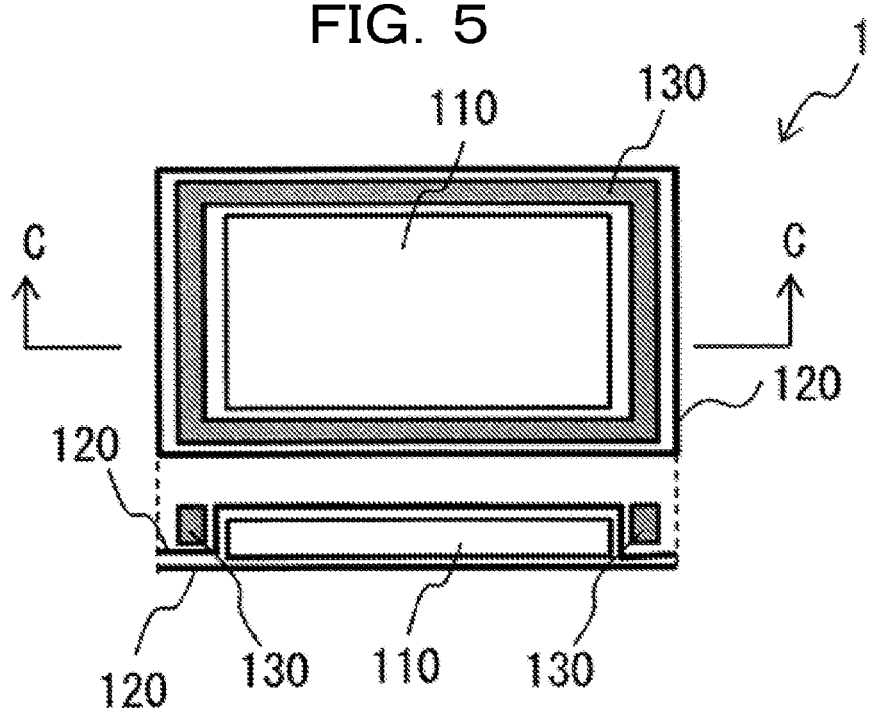
FIG. 5 is a diagram that illustrates another example of the positioning of an auxiliary member.

FIG. 5 is a diagram that illustrates another example of the positioning of an auxiliary member. FIG. 5 illustrates a diagram in which the partition member 1 is seen in a planar view from the thickness direction and a cross-sectional view of a case where the partition member 1 is cut along the line denoted by C-C. In the partition member 1 illustrated in FIG. 5, the auxiliary member 130 is disposed around the periphery of the thermal insulation material 110 in the planar direction. In addition, the auxiliary member 130 is positioned outside the outer package body 120 that encompasses the thermal insulation material 110, as illustrated by the cross-sectional view.

The auxiliary member 130 may be encompassed by the outer package body 120 or positioned outside the outer package body 120, as shown above. In addition, when the thermal insulation material and the auxiliary member are seen in a planar view from the thickness direction, the shape of the thermal insulation material is rectangular, and the auxiliary member may be positioned along two opposite sides of the rectangle, along three sides of the rectangle, along the four sides of the rectangle, or at the four corners of the rectangle. That is, the positioning of the auxiliary member 130 is not limited to an example in which the auxiliary member is positioned along two opposite sides of the thermal insulation material 110, as illustrated in FIG. 4, or an example in which a planar rectangular annular auxiliary member 130 is positioned around the periphery of the thermal insulation material 110, as shown in FIG. 5. In addition, the auxiliary member 130 may be positioned in a U-shape along three sides of the thermal insulation material 110 in the planar direction of the partition member 1. In addition, the auxiliary member 130 may be disposed in such a way that one or more members are adjacent to the sides or the four corners of the thermal insulation material 110. Furthermore, the auxiliary member 130 may be disposed in one or more holes made in the thickness direction of the thermal insulation material 110. The rectangular shape shown above is one example of a rectangle.

[Density Ratio]

In the partition member of the present invention and the under-mentioned assembled battery of the present invention, the ratio of the density of the auxiliary member 130 relative to the density of the thermal insulation material 110 (hereinafter also referred to as the density ratio) is 0.50 to 6.0. If the density ratio is less than 0.50, the auxiliary member 130 undergoes greater compressive deformation than the thermal insulation material 110. In such a case, an excessive load deriving from an external pressure is placed on the thermal insulation material 110, and recoverability following compression of the thermal insulation material 110 decreases. As a result, close adhesion between the thermal insulation material 110 and a single battery or the like decreases, a gap is formed, and thermal resistance between single batteries increases. However, if the density ratio is more than 6.0, the thermal insulation material 110 undergoes greater compressive deformation than the auxiliary member 130. In such a case, when a single battery expands and contracts, the thermal insulation material 110 follows the surface of the single battery and does not undergo elastic deformation, close adhesion to a single battery decreases, and a gap is formed. Therefore, thermal resistance between single batteries increases. The density ratio falls within the range 0.50 to 6.0, and the density ratio is preferably at least 0.55 and more preferably at least 0.60, and is preferably not more than 5.9, and more preferably not more than 5.8. In order to ensure recoverability of the thermal insulation material 110, the density of the auxiliary member 130 is preferably 0.30 to 2.0 g/cm$^3$.

[Area Ratio]

The ratio of the area of the auxiliary member 130 relative to the area of the thermal insulation material 110 (hereinafter referred to as the area ratio) is preferably 0.020 to 1.0. If the area ratio is not more than 1.0, the area of the thermal insulation material 110 increases, meaning that the partition member 1 can readily exhibit a function as a thermal insulation material when an abnormal amount of heat is generated. However, if the area ratio is at least 0.020, it is possible to prevent compression caused by an excessive load on the thermal insulation material 110, and recoverability of the thermal insulation material 110 tends to improve. As a result, it is possible to prevent a gap being formed between the partition member 1 and a single battery, and an increase in thermal resistance can be suppressed. From the perspectives mentioned above, this area ratio is preferably at least 0.030, and more preferably at least 0.040, but is preferably not more than 0.950. The area of the thermal insulation material 110 is generally 10 to 200 cm$^2$, and the area of the auxiliary member 130 should be selected so as to attain the area ratio mentioned above.

[Thickness of Auxiliary Member]

The thickness of the auxiliary member will now be explained using FIG. 6 and FIG. 7. The thickness of the thermal insulation material 110 and that of the auxiliary member 130 can be selected according to the degree of deformation of the thermal insulation material 110 and the auxiliary member 130 under a prescribed constraining force. Because the auxiliary member 130 has a different elastic modulus from the thermal insulation material 110, the degree of deformation when a prescribed constraining force is applied will also be different from that of the thermal insulation material 110.

Figure 6:
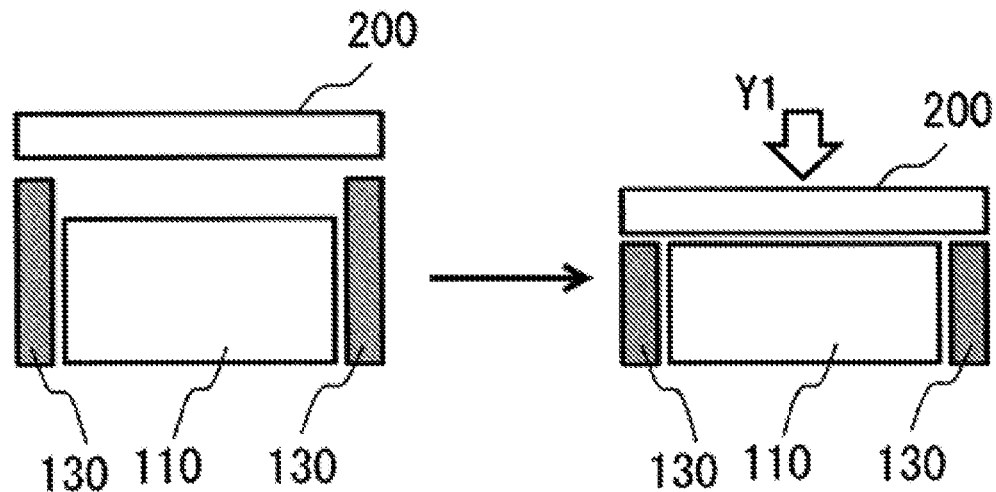
FIG. 6 is a diagram that illustrates a case in which a thermal insulation material is less likely to deform than an auxiliary member.

FIG. 6 is a diagram that illustrates a case in which a thermal insulation material is less likely to deform than an auxiliary member. In cases where the thermal insulation material 110 is less likely to deform than the auxiliary member 130, the thickness of the auxiliary member 130 should be thicker than the thickness of the thermal insulation material 110, as illustrated in FIG. 6. In cases where pressure is exerted on the thermal insulation material 110 and the auxiliary member 130 from a single battery in the direction shown by the arrow Y1, the auxiliary member 130 is compressed and the thicknesses of the thermal insulation material 110 and the auxiliary member 130 are similar. In such a case, the thermal insulation material 110 can efficiently transmit heat by being closely adhered to a single battery.

Figure 7:
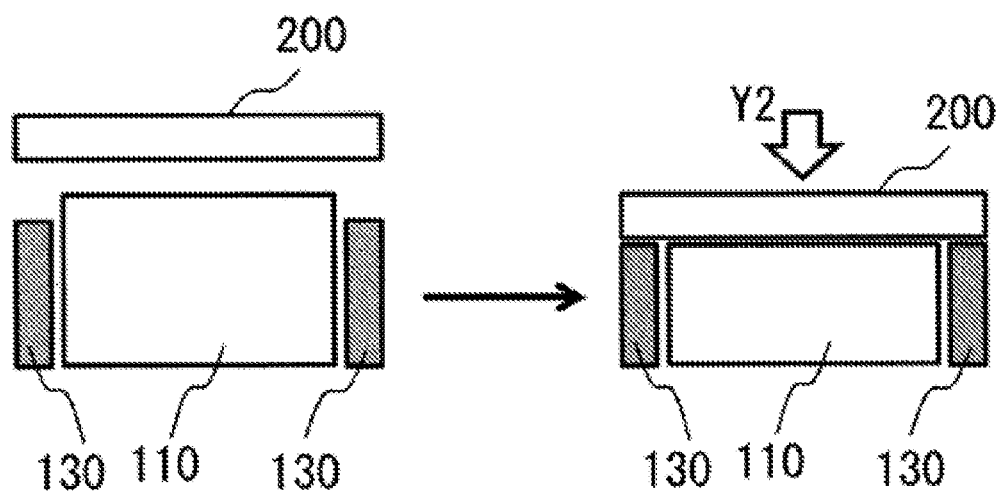
FIG. 7 is a diagram that illustrates a case in which a thermal insulation material is more likely to deform than an auxiliary member.

FIG. 7 is a diagram that illustrates a case in which an encapsulated body is more likely to deform than an auxiliary member. In cases where the thermal insulation material 110 is more likely to deform than the auxiliary member 130, the thickness of the auxiliary member 130 should be thinner than the thickness of the thermal insulation material 110, as illustrated in FIG. 7. In cases where pressure is exerted on the thermal insulation material 110 and the auxiliary member 130 from a single battery in the direction shown by the arrow Y2, the encapsulated body 110 is compressed and the thicknesses of the thermal insulation material 110 and the auxiliary member 130 are similar. In this way, even in a case where the thermal insulation material 110 is more likely to deform than the auxiliary member 130, the thermal insulation material 110 can efficiently transmit heat by being closely adhered to a single battery, in the same way as in a case where the thermal insulation material is less likely to deform than the auxiliary member.

Therefore, the thickness of the thermal insulation material 110 and that of the auxiliary member 130 can be decided so that among the thermal insulation material 110 and the auxiliary member 130, that which should be more likely to deform is thicker. In order to suppress a decrease in close adhesion between the thermal insulation material 110 and a single battery, the ratio of the thickness of the auxiliary member 130 relative to the thickness of the thermal insulation material 110 is preferably 0.80 to 2.0.

<Assembled Battery>

The assembled battery of the present invention is provided with a plurality of single batteries, a thermal insulation material and an auxiliary member, which is disposed so as to be adjacent to the thermal insulation material and regulates the degree of contraction of the thermal insulation material in the thickness direction, wherein the ratio of the density of the auxiliary material relative to the density of the thermal insulation material is 0.50 to 6.0.

The thermal insulation material and auxiliary member used in the assembled battery of the present invention are similar to those explained above with respect to the partition member of the present invention. That is, in the assembled battery of the present invention, it is important for the ratio of the density of the auxiliary material relative to the density of the thermal insulation material to be 0.50 to 6.0, and preferred density ranges for the thermal insulation material and the auxiliary member are also similar.

In addition, in the assembled battery of the present invention, it is preferable to use the liquid and outer package body mentioned above, as explained above with respect to the partition member of the present invention, and embodiments of these are similar to those explained above with respect to the partition member of the present invention.

The partition member of the present invention and the assembled battery of the present invention are used in battery packs fitted to, for example, electric vehicles (EV), hybrid electric vehicles (HEV), plug-in hybrid electric vehicles (PHEV), heavy electrical equipment, electric bikes, power-assisted bicycles, ships, aircraft, electric trains, uninterruptible power supplies (UPS), domestic power storage systems, storage battery systems for power system stabilization systems that use renewable energy such as wind power, solar power, tidal power or geothermal energy, and the like. However, the assembled battery can also be used as a power source for supplying electrical power to equipment other than the EVs and the like mentioned above.

[Single Battery]

Figure 8:
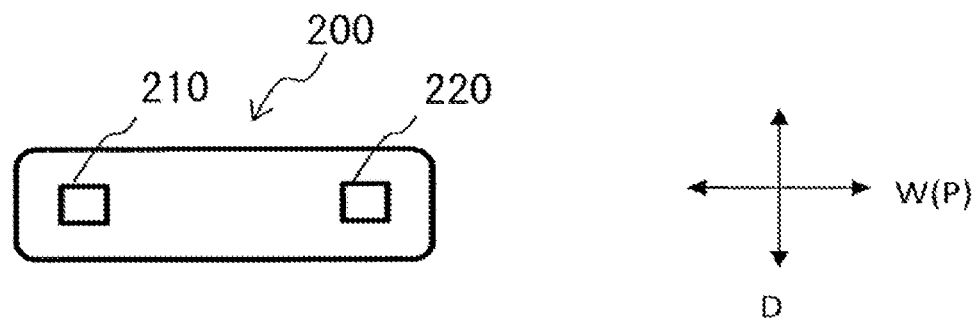
FIG. 8 illustrates an example of a single battery.
Figure 9:
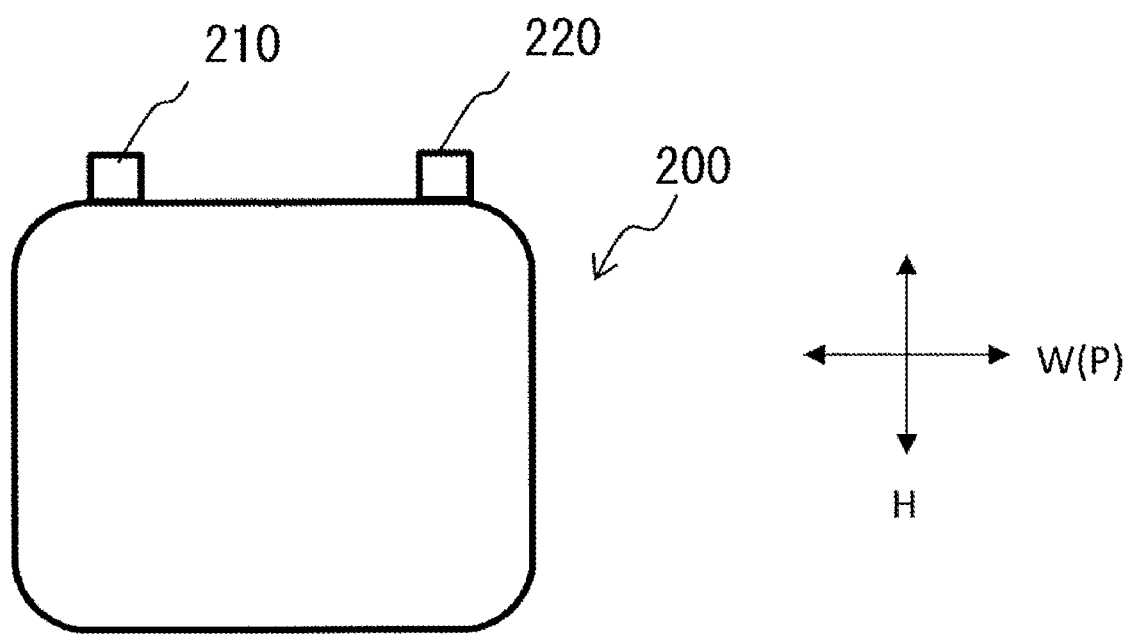
FIG. 9 is a front view of the single battery illustrated in FIG. 8.
Figure 10:
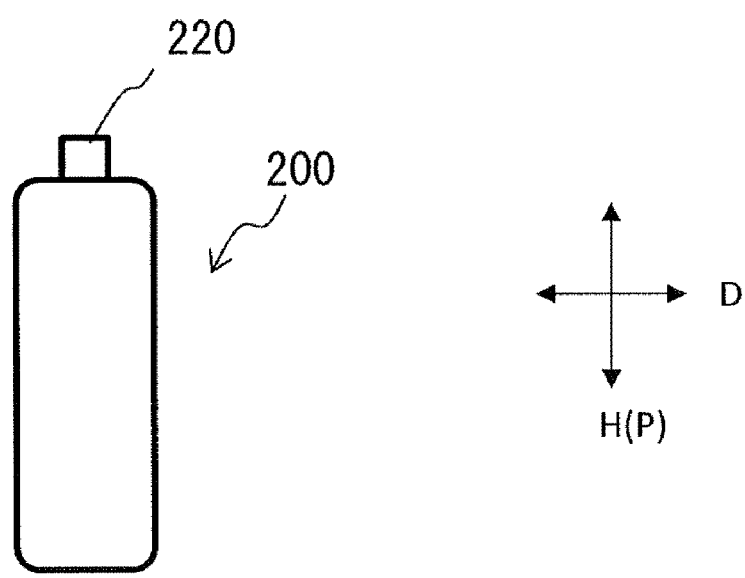
FIG. 10 is a side view of the single battery illustrated in FIG. 8.

FIG. 8 is a planar view that illustrates an example of a single battery that constitutes an assembled battery, FIG. 9 is a front view of the single battery illustrated in FIG. 8, and FIG. 10 is a right side view of this single battery. A single battery 200 is formed as a cuboid shape having a height direction (H), a width direction (W) and a thickness direction (D), and a terminal 210 and a terminal 220 are provided on the top surface of the single battery. The single battery 200 is, for example, a lithium ion secondary battery provided with a positive electrode and negative electrode, which are capable of storing and releasing lithium ions, and an electrolyte. In addition to lithium ion secondary batteries, it is possible to use a secondary battery such as a lithium ion all solid state battery, a nickel-metal hydride battery, a nickel-cadmium battery or a lead storage battery.

[Assembled Battery]

Figure 11:
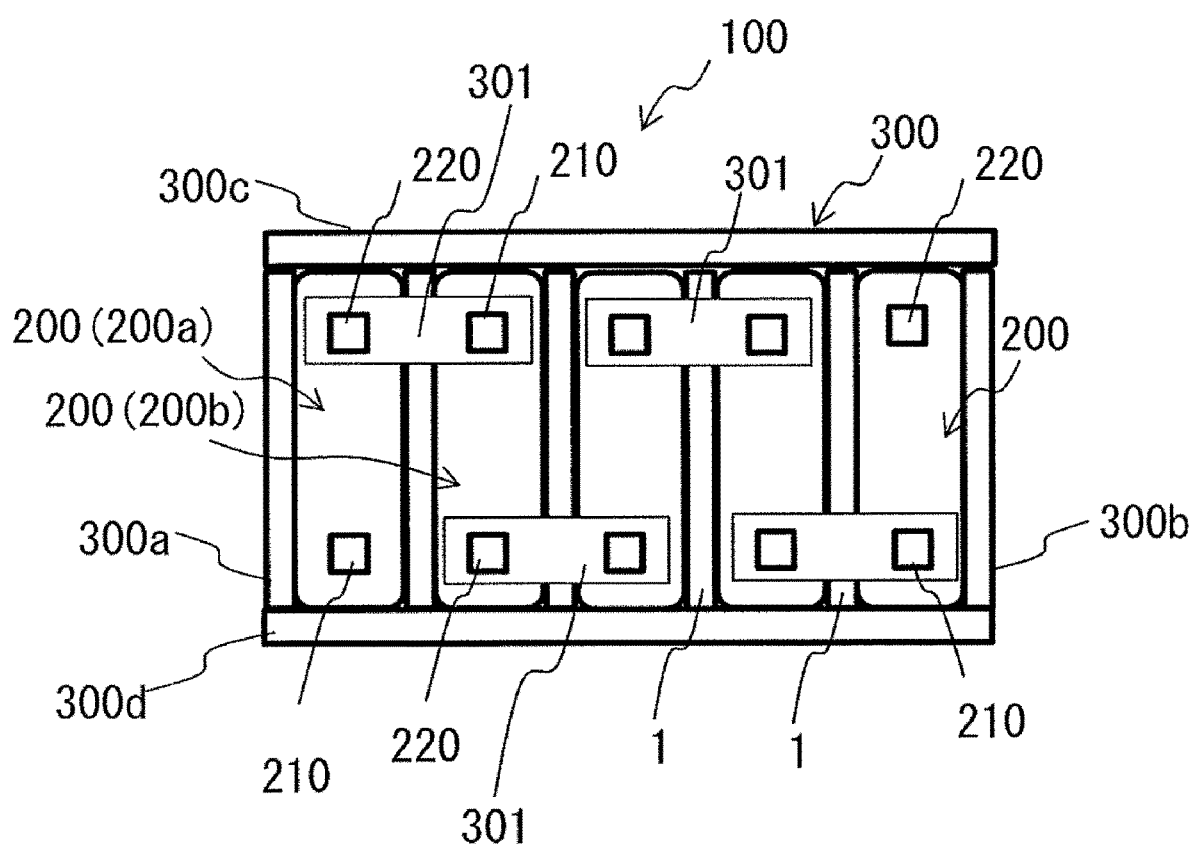
FIG. 11 is a top view that illustrates an example of an assembled battery.
Figure 12:
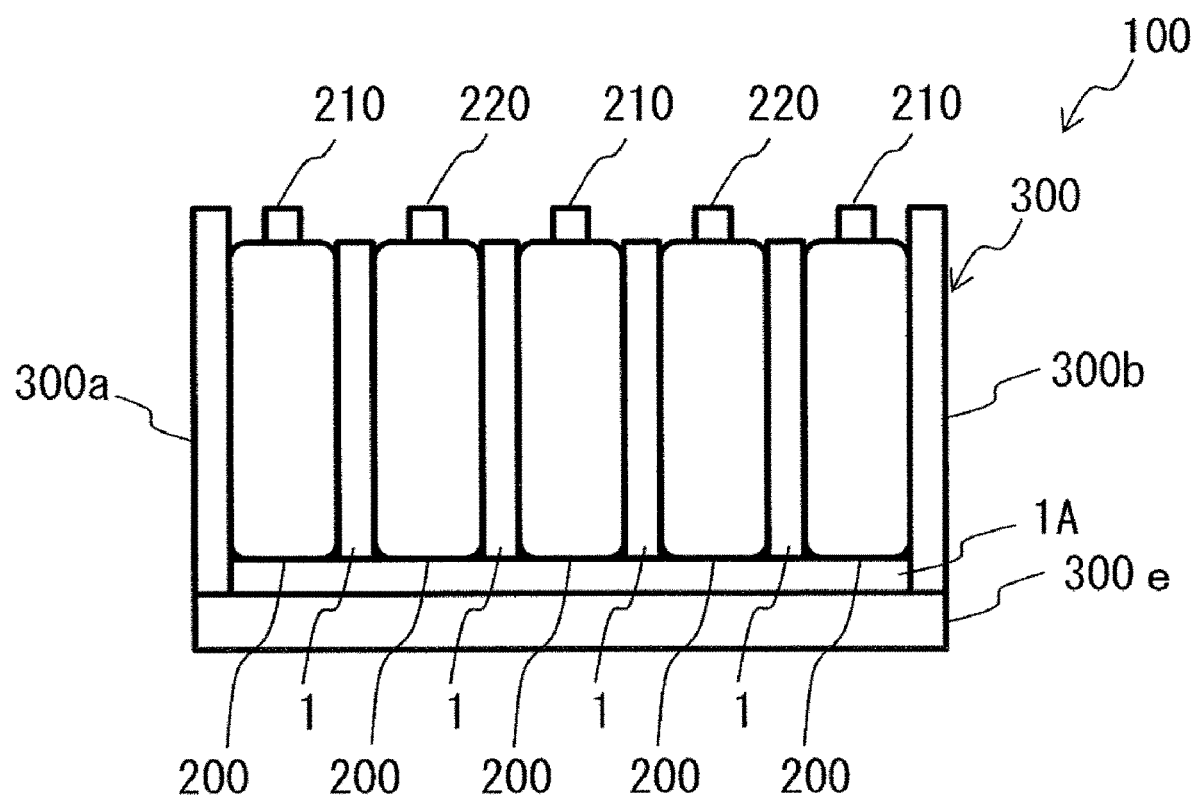
FIG. 12 is a side view that schematically illustrates a side surface of the assembled battery illustrated in FIG. 11, in a state whereby a side plate on the front side has been removed.

FIG. 11 illustrates the top surface of an assembled battery 100 formed using a plurality of single batteries 200, and FIG. 12 is a side view that schematically illustrates a state in which a side plate 300d has been removed from the assembled battery 100 shown in FIG. 11. In FIG. 11 and FIG. 12, the assembled battery 100 includes a housing 300 and a plurality of single batteries 200 accommodated inside the housing 300. The housing 300 has a bottom plate 300e and side plates 300a, 300b, 300c and 300d, which are provided in an upright manner around the periphery of the bottom plate 300e. In FIG. 11 and FIG. 12, five single batteries 200 are used as an example, but the number of single batteries can be selected as appropriate.

The plurality of single batteries 200 are arranged in the thickness direction inside the housing 300, and partition members 1 described above are disposed between single batteries 200. The assembled battery 100 outputs electrical power as a result of positive electrode terminals (for example, terminals 210) and negative electrode terminals (for example, terminals 220) of single batteries 200, which are adjacent to (opposite) each other with the partition member 1 disposed therebetween, being electrically connected in series by means of bus bars 301. A partition member 1A is arranged between the bottom plate 300e of the housing 300 and the single batteries 200 in the assembled battery 100, as illustrated in FIG. 12. The partition member 1A has a similar configuration to the partition member 1.

<Methods for Confirming Partition Member and Assembled Battery>

Whether or not a given partition member or assembled battery corresponds to the partition member of the present invention or the assembled battery of the present invention should be confirmed in the following way.

1) A thermal insulation material and an auxiliary member are removed from a partition member or assembled battery to be confirmed.
2) The removed thermal insulation material and auxiliary member are dried. For example, vacuum drying overnight at 90° C. may be used as the drying method.
3) The density values of the dried thermal insulation material and auxiliary member are measured. The density can be measured by, for example, producing a punched sample using a hand punch having a diameter Φ of 12.5 mm, measuring the thickness of the sample using a contact type thickness measurement device (a digimatic indicator available from Mitutoyo Corporation), and measuring the weight using an electronic balance.

4) The ratio of the density of the auxiliary member relative to the density of the thermal insulation material is calculated.

EXAMPLES

Examples relating to the present invention will now be explained.

Examples 1 to 4 and Comparative Examples 1 and 2

Example 1

A partition member measuring 50 mm×50 mm was obtained by arranging two pieces of an ethylene-propylene rubber (thickness 1.03 mm, density 1.24 g/cm$^3$), each measuring 5 mm×50 mm, as auxiliary members on the left and right of a thermal insulation sheet (thickness 1.14 mm, density 0.85 g/cm$^3$, containing vermiculite and glass fibers) measuring 40 mm×50 mm as a thermal insulation material.

(1) Density Ratio

The ratio of the density of the auxiliary member relative to the density of the thermal insulation material (the density ratio) of the partition member according to Example 1 was determined to be 1.4 by dividing the density of the auxiliary member (1.2 g/cm$^3$) by the density of the thermal insulation material (0.85 g/cm$^3$).

(2) Area Ratio

The area of the auxiliary member of the partition member according to Example 1 was determined as the total area of the two pieces of ethylene-propylene rubber (each of which had an area of 5 mm×50 mm=250 mm$^2$), that is, 500 mm$^2$, and the area of the thermal insulation material was determined to be 40 mm×50 mm=2000 mm$^2$. Therefore, the ratio of the area of the auxiliary member relative to the area of the thermal insulation material (the area ratio) in the partition member according to Example 1 was determined to be 0.25 by dividing the area of the auxiliary member (500 mm$^2$) by the area of the thermal insulation material (2000 mm$^2$). The areas of the auxiliary member and the thermal insulation material were taken to be areas when the partition member was seen in a planar view from the thickness direction.

(3) Deformation Rate

A metal plate (SUS 430, available from Misumi Group Inc., measuring 100 mm×150 mm×35 mm) was placed on the partition member according to Example 1, and a load of 1.3 t (corresponding to 52 kgf/cm$^2$) was applied for 1 minute using a high pressure jack (J-15, available from AS ONE Corporation). After the metal plate was removed and the partition member was allowed to rest for 1 minute, the thickness of the thermal insulation material was 0.97 mm when measured using a contact type film thickness measurement device (a digimatic indicator available from Mitutoyo Corporation). The deformation rate was calculated using formula 1 below, wherein L1 denotes the thickness of the thermal insulation material prior to deformation of the partition member and L2 denotes the thickness of the thermal insulation material after being released from compression and then allowed to rest for 1 minute.

$$\{(L1-L2)/L1\}\times 100 \quad \text{(formula 1)}$$

Because L1=1.14 mm and L2=0.97 mm, the deformation rate of the partition member according to Example 1 was calculated to be 14.9%.

Example 2

A partition member was obtained by using a biosoluble fiber sheet (thickness 0.93 mm, density 0.25 g/cm$^3$, containing alkaline earth silicate wool) measuring 26 mm×50 mm instead of the thermal insulation material of the partition member in Example 1 and using a nitrile rubber (thickness 1.06 mm, density 1.4 g/cm$^3$) measuring 12 mm×50 mm as the auxiliary member. The partition member according to Example 2 was tested in the same way as Example 1. After the partition member according to Example 2 was released from compression and allowed to rest for 1 minute, the thickness of the thermal insulation material was 0.87 mm. The density ratio, area ratio and deformation rate of the partition member according to Example 2 were determined using the methods explained in Example 1.

Example 3

A thermal insulation sheet measuring 75 mm×75 mm (similar to that used in Example 1) was used instead of the thermal insulation material in the partition member according to Example 1, and a hole having a diameter Φ of 12.5 mm was made in the center of the sheet. In addition, a fluororubber (thickness 1.05 mm, density 1.8 g/cm$^3$) having a diameter Φ of 12.5 mm was inserted as an auxiliary member in the hole made in the thermal insulation material so as to obtain a partition member measuring 75 mm×75 mm. In the same way as in Example 1, a metal plate was placed on the partition member and a load of 2.9 t (corresponding to 52 kgf/cm$^2$) was applied for 1 minute. After the metal plate was removed and the partition member was allowed to rest for 1 minute, the thickness of the thermal insulation material was 0.94 mm when measured. The density ratio, area ratio and deformation rate of the partition member according to Example 3 were determined using the methods explained in Example 1.

Example 4

An inorganic filling sheet (thickness 1.02 mm, density 0.54 g/cm$^3$, containing rock wool and aluminum hydroxide) measuring 90 mm×90 mm was used instead of the thermal insulation material in the partition member according to Example 1, and two holes each having a diameter of 12.5 mm were made in the center of the sheet. In addition, a silicone sponge rubber (thickness 1.00 mm, density 0.40 g/cm$^3$) having a diameter Φ of 12.5 mm was inserted as an auxiliary member in the holes made in the thermal insulation material so as to obtain a partition member measuring 90 mm×90 mm. In the same way as in Example 1, a metal plate was placed on the partition member and a load of 4.1 t (corresponding to 52 kgf/cm$^2$) was applied for 1 minute. After the metal plate was removed and the partition member was allowed to rest for 1 minute, the thickness of the thermal insulation material was 0.82 mm when measured. The density ratio, area ratio and deformation rate of the partition member according to Example 4 were determined using the methods explained in Example 1.

Comparative Example 1

A partition member was obtained by using a thermal insulation sheet (similar to that used in Example 1) measuring 24 mm×50 mm instead of the thermal insulation material in the partition member according to Example 1 and using a silicone sponge rubber measuring 13 mm×50 mm as the auxiliary member. The partition member according to Comparative Example 1 was tested in the same way as Example 1. After the partition member according to Comparative Example 1 was released from compression and allowed to rest for 1 minute, the thickness of the thermal insulation material was 0.74 mm. The density ratio, area ratio and deformation rate of the partition member according to Comparative Example 1 were determined using the methods explained in Example 1.

Comparative Example 2

A partition member was obtained by using a biosoluble fiber sheet (thickness 1.06 mm, density 0.21 g/cm$^3$, containing alkaline earth silicate wool) measuring 40 mm×50 mm instead of the thermal insulation material of the partition member in Example 1 and using a soft chloroprene rubber (thickness 1.07 mm, density 1.3 g/cm$^3$) measuring 5 mm×50 mm as the auxiliary member. The partition member according to Comparative Example 2 was tested in the same way as Example 1. After the partition member according to Comparative Example 2 was released from compression and allowed to rest for 1 minute, the thickness of the thermal insulation material was 0.65 mm. The density ratio, area ratio and deformation rate of the partition member according to Comparative Example 2 were determined using the methods explained in Example 1.

The density ratio (the ratio of the density of the auxiliary member relative to the density of the thermal insulation material), the area ratio (the ratio of the area of the auxiliary member relative to the area of the thermal insulation material) and the deformation rate of Examples 1 to 4 and Comparative Examples 1 and 2 are listed in Table 1 below.

In Comparative Example 2, the density ratio in the partition member was more than 6.0, the thermal insulation material underwent greater compressive deformation than the auxiliary member, and the deformation rate following release from compression was 38.7%. Therefore, in the partition member according to Comparative Example 2, the thermal insulation material followed the surface of the single battery following release of compression, did not undergo elastic deformation, and underwent a decrease in close adhesion to the single battery.

Examples 5 to 8 and Comparative Examples 4 and 5

Example 5

A partition member having a height of 90 mm, a width of 90 mm and a thickness of 1.40 mm was obtained by arranging two sheets of an ethylene-propylene rubber measuring 5 mm×50 mm as an auxiliary member on the left and right of a thermal insulation sheet measuring 40 mm×50 mm (the same type as that used in Example 1) as a thermal insulation material, placing 1 cm$^3$ of water as a liquid in a laminated aluminum film (including polyethylene terephthalate (outside) and polyethylene (inside) as resin layers; thickness 0.15 cm) as an outer package body, and then (tightly) sealing using vacuum deaeration sealer (FCB-200 available from FUJIIMPULSE Co., Ltd.). After the partition member 1 according to Example 5 was released from compression and allowed to rest for 1 minute, the thickness of the partition member was 1.17 mm. The density ratio, area ratio and deformation rate of the partition member according to Example 5 were determined using the methods explained in Example 1.

Example 6

A partition member having a height of 90 mm, a width of 90 mm and a thickness of 1.17 mm was obtained by using

TABLE 1

| | Density (g/cm$^3$) | | | Area (mm$^2$) | | | |
|---|---|---|---|---|---|---|---|
| | Thermal insulation material | Auxiliary member | Density ratio | Thermal insulation material | Auxiliary member | Area ratio | Deformation rate (%) |
| Example 1 | 0.85 | 1.2 | 1.4 | 2000 | 500 | 0.25 | 14.9 |
| Example 2 | 0.25 | 1.4 | 5.6 | 1300 | 1200 | 0.92 | 6.5 |
| Example 3 | 0.85 | 1.8 | 2.1 | 5502 | 123 | 0.022 | 17.5 |
| Example 4 | 0.54 | 0.40 | 0.74 | 7855 | 245 | 0.031 | 19.6 |
| Comparative Example 1 | 0.85 | 0.40 | 0.47 | 1200 | 1300 | 1.1 | 35.1 |
| Comparative Example 2 | 0.21 | 1.3 | 6.2 | 2000 | 500 | 0.25 | 38.7 |

The deformation rate of the partition member was not more than 20° in Examples 1 to 4. In these cases, a reduction in close adhesion between the partition member and a single battery was suppressed in these examples.

In Comparative Example 1, the density ratio in the partition member was less than 0.50, and the auxiliary member underwent greater compressive deformation than the thermal insulation material. Because the thermal insulation material was compressed due to application of an excessive load, the deformation rate increased to 35.1%. Therefore, the partition member according to Comparative Example 1 underwent a decrease in close adhesion to a single battery following release from compression.

a biosoluble fiber sheet measuring 26 mm×50 mm (the same type as that used in Example 2) instead of the thermal insulation material in the partition member of Example 5, using a nitrile rubber measuring 12 mm×50 mm as an auxiliary member, and using 0.5 cm$^3$ of water as a liquid. The partition member according to Example 6 was tested in the same way as Example 1. After the partition member according to Example 6 was released from compression and allowed to rest for 1 minute, the thickness of the partition member was 0.957 mm. The density ratio, area ratio and deformation rate of the partition member according to Example 6 were determined using the methods explained in Example 1.

Example 7

A thermal insulation sheet measuring 75 mm×75 mm (similar to that used in Example 1) was used instead of the thermal insulation material in the partition member according to Example 5, and a hole having a diameter Φ of 12.5 mm was made in the center of the sheet. In addition, a partition member having a height of 115 mm, a width of 115 mm and a thickness of 1.36 mm was obtained by inserting a fluororubber having a diameter Φ of 12.5 mm as an auxiliary member in the hole made in the thermal insulation material and using 3 cm$^3$ of water as a liquid. In the same way as in Example 1, a metal plate was placed on the partition member and a load of 2.9 t (corresponding to 52 kgf/cm$^2$) was applied for 1 minute. After the metal plate was removed and the partition member was allowed to rest for 1 minute, the thickness of the partition member was 1.13 mm when measured. The density ratio, area ratio and deformation rate of the partition member according to Example 7 were determined using the methods explained in Example 1.

Example 8

An inorganic filling sheet measuring 90 mm×90 mm (similar to that used in Example 4) was used instead of the thermal insulation material in the partition member according to Example 5, and two holes each having a diameter Φ of 12.5 mm were made in the center of the sheet. In addition, a partition member having a height of 130 mm, a width of 130 mm and a thickness of 1.20 mm was obtained by inserting a silicone sponge rubber having a diameter Φ of 12.5 mm as an auxiliary member in the hole made in the thermal insulation material and using 4 cm$^3$ of water as a liquid. In the same way as in Example 1, a metal plate was placed on the partition member and a load of 4.1 t (corresponding to 52 kgf/cm$^2$) was applied for 1 minute. After the metal plate was removed and the partition member was allowed to rest for 1 minute, the thickness of the partition member was 1.03 mm when measured. The density ratio, area ratio and deformation rate of the partition member according to Example 8 were determined using the methods explained in Example 1.

Comparative Example 3

A partition member having a height of 90 mm, a width of 90 mm and a thickness of 1.41 mm was obtained by using a thermal insulation sheet measuring 24 mm×50 mm (the same type as that used in Example 1) instead of the thermal insulation material in the partition member of Example 5, using a silicone sponge rubber measuring 13 mm×50 mm as an auxiliary member, and using 0.5 cm$^3$ of water as a liquid. The partition member according to Comparative Example 3 was tested in the same way as Example 1. After the partition member according to Comparative Example 3 was released from compression and allowed to rest for 1 minute, the thickness of the partition member was 1.13 mm. The density ratio, area ratio and deformation rate of the partition member according to Comparative Example 3 were determined using the methods explained in Example 1.

Comparative Example 4

A partition member having a height of 90 mm, a width of 90 mm and a thickness of 1.17 mm was obtained by using a biosoluble fiber sheet measuring 40 mm×50 mm (the same type as that used in Example 2) instead of the thermal insulation material in the partition member of Example 5, using a fluororubber measuring 5 mm×50 mm as an auxiliary member, and using 1 cm$^3$ of water as a liquid. The partition member according to Comparative Example 4 was tested in the same way as Example 1. After the partition member according to Comparative Example 4 was released from compression and allowed to rest for 1 minute, the thickness of the partition member was 0.902 mm. The density ratio, area ratio and deformation rate of the partition member according to Comparative Example 4 were determined using the methods explained in Example 1.

TABLE 2

| | Density (g/cm$^3$) | | | Area (mm$^2$) | | | |
| --- | --- | --- | --- | --- | --- | --- | --- |
| | Thermal insulation material | Auxiliary member | Density ratio | Thermal insulation material | Auxiliary member | Area ratio | Deformation rate (%) |
| Example 5 | 0.85 | 1.2 | 1.4 | 2000 | 500 | 0.25 | 16.7 |
| Example 6 | 0.25 | 1.4 | 5.6 | 1300 | 1200 | 0.92 | 17.9 |
| Example 7 | 0.85 | 1.8 | 2.1 | 5502 | 123 | 0.022 | 16.6 |
| Example 8 | 0.54 | 0.40 | 0.74 | 7855 | 245 | 0.031 | 14.5 |
| Comparative Example 3 | 0.85 | 0.40 | 0.47 | 1200 | 1300 | 1.1 | 20.3 |
| Comparative Example 4 | 0.25 | 1.8 | 7.2 | 2000 | 500 | 0.25 | 22.6 |

The deformation rate of the partition member was less than 20% in Examples 5 to 8. In these cases, a reduction in close adhesion between the partition member and a single battery was suppressed in these examples.

In Comparative Example 3, the density ratio in the partition member was less than 0.50, and the auxiliary member underwent greater compressive deformation than the thermal insulation material. Because the thermal insulation material was compressed due to application of an excessive load, the deformation rate increased to 20.3%. Therefore, the partition member according to Comparative Example 3 underwent a decrease in close adhesion to a single battery following release from compression.

In Comparative Example 4, the density ratio in the partition member was more than 6.0, the thermal insulation material underwent greater compressive deformation than the auxiliary member, and the deformation rate following release from compression was 22.6%. Therefore, in the partition member according to Comparative Example 2, the thermal insulation material followed the surface of the single battery following release of compression, did not undergo elastic deformation, and underwent a decrease in close adhesion to the single battery.

As explained above, in cases where the ratio of the density of the auxiliary member relative to the density of the thermal insulation material is 0.50 to 6.0, the partition member can limit the deformation rate within a favorable range even in an environment where the external pressure changes. Due to this configuration, the partition member can suppress a decrease in thermal conductivity caused by a decrease in close adhesion to a single battery. Moreover, features explained in the embodiments above may be combined as appropriate as long as these do not deviate from the purpose of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A partition member which has a thickness direction and a planar direction orthogonal to the thickness direction and which constitutes a partition between single batteries in the thickness direction or between a single battery and a member other than the single battery, the partition member comprising:
   a thermal insulation material; and
   an auxiliary member which is disposed so as to be adjacent to the thermal insulation material in the planar direction and regulates a degree of contraction of the thermal insulation material in the thickness direction,
   wherein a ratio of a density of the auxiliary member relative to a density of the thermal insulation material is 0.50 to 6.0, and
   wherein the partition member further comprises an exterior body configured to encapsulate the thermal insulation material, the auxiliary member being disposed out of the exterior body.

2. The partition member according to claim 1, wherein a ratio of an area of the auxiliary member relative to an area of the thermal insulation material is 0.020 to 1.0 when the thermal insulation material and the auxiliary member are seen in a planar view from the thickness direction.

3. The partition member according to claim 1, wherein the density of the thermal insulation material is 0.23 $g/cm^3$ to 1.1 $g/cm^3$.

4. The partition member according to claim 1, wherein the density of the auxiliary member is 0.30 $g/cm^3$ to 2.0 $g/cm^3$.

5. The partition member according to claim 1, wherein when the thermal insulation material and the auxiliary member are seen in a planar view from the thickness direction, the shape of the thermal insulation material is rectangular, and the auxiliary member is positioned along two opposite sides of the rectangle, along three sides of the rectangle, along four sides of the rectangle, or at four corners of the rectangle.

6. The partition member according to claim 1, wherein the thermal insulation material is formed of a material that contains a porous body capable of retaining a liquid.

7. The partition member according to claim 6, wherein the porous body contains at least one of a fibrous substance and particles.

8. The partition member according to claim 1, comprising an outer package body for accommodating the thermal insulation material and the auxiliary member.

9. The partition member according to claim 8, wherein the outer package body is a laminated body of a metal foil and a resin.

10. The partition member according to claim 9, wherein the metal foil is at least one type selected from an aluminum foil, a copper foil, a tin foil, a nickel foil, a stainless steel foil, a lead foil, a tin-lead alloy foil, a bronze foil, a silver foil, an iridium foil, and phosphor bronze.

11. The partition member according to claim 9, wherein the resin is a thermoplastic resin.

12. An assembled battery comprising:
    a plurality of single batteries;
    a thermal insulation material; and
    an auxiliary member which is disposed so as to be adjacent to the thermal insulation material and regulates a degree of contraction of the thermal insulation material in a thickness direction of the thermal insulation material,
    wherein a ratio of a density of the auxiliary member relative to a density of the thermal insulation material is 0.50 to 6.0, and
    wherein the assembled battery further comprises an exterior body configured to encapsulate the thermal insulation material, the auxiliary member being disposed out of the exterior body.

13. The assembled battery according to claim 12, wherein a ratio of an area of the auxiliary member relative to an area of the thermal insulation material is 0.020 to 1.0 when the thermal insulation material is seen in a planar view from the thickness direction.

14. The assembled battery according to claim 12, wherein the density of the thermal insulation material is 0.23 $g/cm^3$ to 1.1 $g/cm^3$.

15. The assembled battery according to claim 12, wherein the density of the auxiliary member is 0.30 $g/cm^3$ to 2.0 $g/cm^3$.

16. The assembled battery according to claim 12, wherein when the thermal insulation material and the auxiliary member are seen in a planar view from the thickness direction, the shape of the thermal insulation material is rectangular, and the auxiliary member is positioned along two opposite sides of the rectangle, along three sides of the rectangle, along four sides of the rectangle, or at four corners of the rectangle.

17. The assembled battery according to claim 12, wherein the thermal insulation material is formed of a material that contains a porous body capable of retaining a liquid.

18. The partition member according to claim 1, wherein the auxiliary member deforms in response to contraction of the single batteries or the single battery and the member other than the single battery.

19. The assembled battery according to claim 12, wherein the auxiliary member deforms in response to contraction of the single batteries or the single battery and the member other than the single battery.

* * * * *